Oct. 11, 1938.　　　S. T. CAMPBELL　　　2,133,019

MOLD

Filed March 26, 1936

INVENTOR.
STANLEY T. CAMPBELL
BY Kwis, Hudson & Kent
ATTORNEYS.

Patented Oct. 11, 1938

2,133,019

UNITED STATES PATENT OFFICE 2,133,019

MOLD

Stanley T. Campbell, Cleveland, Ohio, assignor to The Aetna Rubber Company, Cleveland, Ohio, a corporation of Ohio Application March 26, 1936, Serial No. 70,979

4 Claims. (Cl. 18—42)

The present invention relates to molds and more particularly to a two-part mold for making articles having internal threads or the like thereon.

An object of the present invention is the provision of a novel two-part mold for making objects provided with internal threads.

Another object of the invention is the provision of a novel two-part mold for making cell covers or the like having internally threaded vent openings therein.

Other objects and advantages of the invention will be apparent from the following description of the preferred embodiment thereof described with reference to the accompanying drawing forming a part of this specification, in which.

Figure 1:
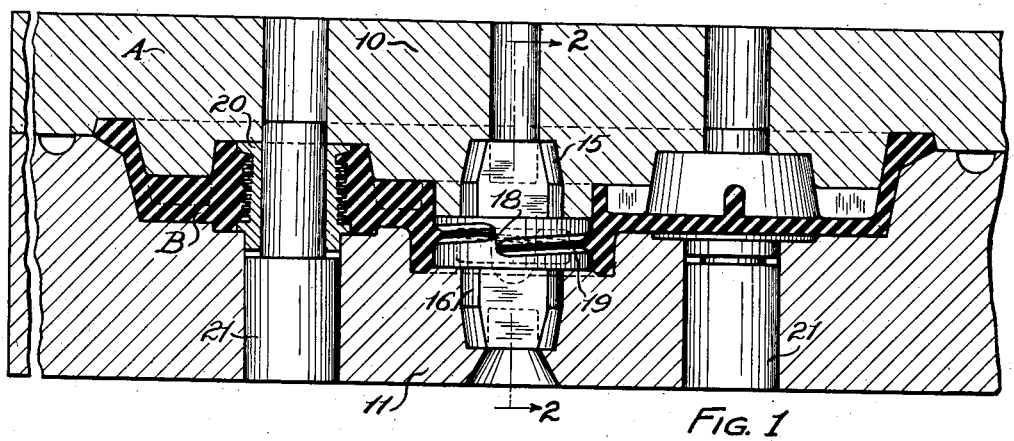
Fig. 1 is a longitudinal section, with portions in elevation, through a mold embodying the present invention.
Figure 2:
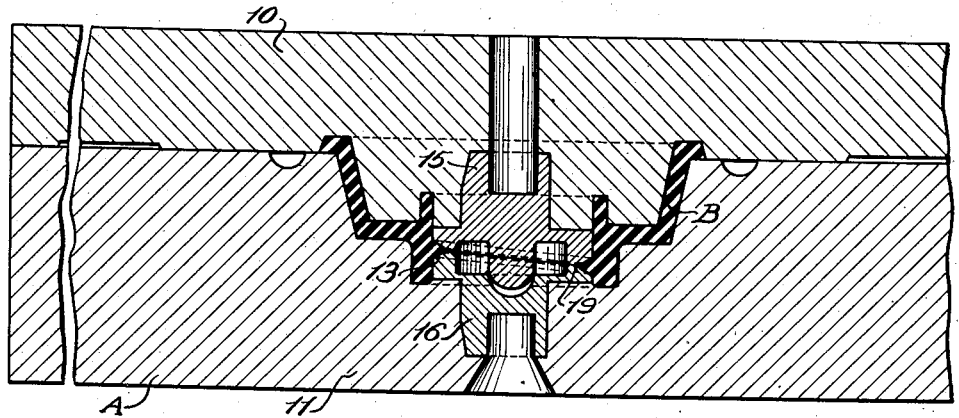
Fig. 2 is a section on the line 2—2 of Fig. 1.
Figure 4:
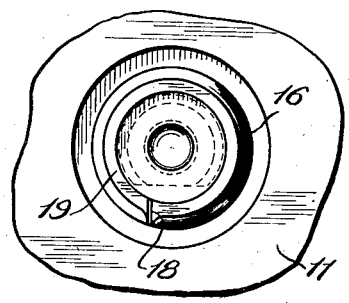
Fig. 4 is a fragmentary plan of the lower half of the mold shown in Figs. 1 and 2.
Figure 3:
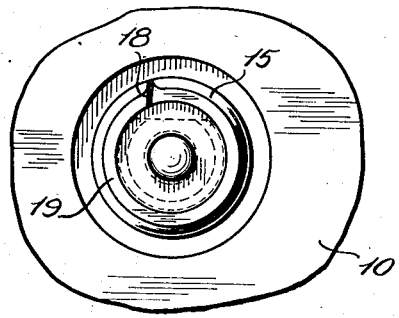
Fig. 3 is a fragmentary bottom view of the upper half of the mold shown in Figs. 1 and 2.

The invention is particularly applicable to the molding of cell covers for storage batteries having an internally threaded vent or filler opening therein, and in the preferred embodiment of the invention herein illustrated and described, it is disclosed as embodied in such a mold. It is to be understood, however, that the invention is applicable to the making of other articles and that the preferred embodiment thereof herein shown and described is merely illustrative thereof.

Referring to the drawing the reference character A designates the complete mold which comprises upper and lower half-molds or parts 10 and 11, commonly referred to as the block plate and cavity plate, respectively. As previously stated the invention is illustrated as embodied in a mold for forming cell covers. The cell cover made by the particular mold in question is shown in the mold cavity, and is designated in the drawing by the reference character B. The thread 13 in the vent or filler opening by means of which the vent or filler plug is secured in the opening in a well known manner extends not more than 360° about the inner wall which defines the vent or filler opening and is adapted to be formed or molded by two members 15 and 16 carried by the block and cavity plates, respectively, the parting line of which coincides with the meridian line or the crest of the thread.

The ends or faces of the members 15 and 16, which members in effect are projections in the mold cavity, are inclined, and beveled around the outside except immediately adjacent that portion 18 of the parting line which extends between the ends of the thread. The construction is such that when the mold is closed the members 15 and 16 form a cylindrical surface having a spiral groove or thread intermediate the ends thereof. The form of the thread is that of a milled thread, in other words, it appears to have been made by a mill cutter, which may very well be the case.

For the purpose of facilitating manufacture the members 15 and 16 are preferably formed separately, as illustrated, and are fixed in suitable apertures formed in the block and cavity plates, but it will be apparent that they may be formed integral with the respective parts to which they are attached, in which case they will merely constitute projections thereon.

Preferably the thread 13 extends slightly less than 360° and the portion 18 of the parting line or surface 19 between the two members 15 and 16, which extends between the opposite ends of the thread, is at a slight angle to the direction of relative movement between the plates, that is, to the vertical, as shown, see Fig. 1, to provide draft. The portion 18 of the parting surface is also at a slight angle to the axis of the vent or filler opening.

In the particular cell cover illustrated bushing members 20, through which the terminal posts project in use, are molded in the cover at opposite sides of the vent or filler opening. For this purpose the block plate is provided with suitable apertures within which the lower reduced ends of the bushings project and through the medium of which they are held in position. Members 21 positioned in the apertures in the block plate assist in holding the bushings in position and may be used as ejectors for removing the finished cover.

From the foregoing description of the preferred embodiment of the invention, it will be apparent that a novel two-part mold has been provided, capable of producing articles having internal threads. While the preferred embodiment of the invention has been illustrated and described in some detail, I do not wish to be limited to the particular construction shown which may be varied within the scope of this invention, and I particularly point out and claim as my invention the following:

I claim:

1. A mold for forming an article having an internal thread of a single turn, said mold comprising two separable mold members having a cavity and provided with aligned projections forming a cylindrical core, the ends of the projections abutting each other when the mold is closed and having beveled edges which form on the exterior of the core a spiral groove of not more than 360° in extent, the parting line of said projections being along the bottom of said groove and extending between the offset ends thereof.

2. A mold for forming a storage battery cell cover having a vent or filler opening provided with an internal thread, said mold comprising two separable half-molds having a cavity and having aligned projections therein the abutting faces of which are spirally arranged and beveled to form a cylindrical core or surface having a spiral groove extending less than 360° thereabout, the parting line of said projections being along the bottom of said groove and connected to opposite ends thereof.

3. A mold for forming an article having an internal thread, said mold comprising two separable mold sections having a cavity with aligned abutting projections therein constituting a cylindrical core, said core being provided on its surface at the parting line between the projections with a spiral thread-forming groove of not more than 360° in extent.

4. A mold for forming an article having an internal thread, said mold comprising two separable mold members having a cavity and provided therein with aligned projections forming a cylindrical core, the ends of the projections abutting each other when the mold is closed and the abutting faces of the projections being spirally formed and beveled to form on the cylindrical surface of the core a spiral groove of not more than 360°, the parting line of said projections being along the bottom of said groove and connecting the opposite ends thereof.

STANLEY T. CAMPBELL.